(12) United States Patent
Paranjape et al.

(10) Patent No.: US 11,467,896 B2
(45) Date of Patent: Oct. 11, 2022

(54) SECTIONS IN CRASH DUMP FILES

(71) Applicant: HEWLETT PACKARD ENTERPRISE DEVELOPMENT LP, Houston, TX (US)

(72) Inventors: Prashant Anant Paranjape, Bangalore (IN); Paul E Stolle, Modesto, CA (US); Sandhiya Krishnasamy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 400 days.

(21) Appl. No.: 16/559,053

(22) Filed: Sep. 3, 2019

(65) Prior Publication Data

US 2021/0064457 A1  Mar. 4, 2021

(51) Int. Cl.
| G06F 11/00 | (2006.01) |
|---|---|
| G06F 11/07 | (2006.01) |
| G06F 11/10 | (2006.01) |
| G06F 40/205 | (2020.01) |

(52) U.S. Cl.
CPC ...... *G06F 11/0778* (2013.01); *G06F 11/1004* (2013.01); *G06F 40/205* (2020.01)

(58) Field of Classification Search
CPC ............. G06F 11/0778; G06F 11/1004; G06F 11/0721; G06F 11/0766; G06F 11/0775; G06F 40/205
See application file for complete search history.

(56) References Cited

U.S. PATENT DOCUMENTS

| 6,681,348 | B1 | 1/2004 | Vachon | |
|---|---|---|---|---|
| 8,166,313 | B2 | 4/2012 | Fedtke | |
| 9,672,347 | B2 | 6/2017 | Bauer et al. | |
| 9,710,321 | B2 | 7/2017 | Zhao et al. | |
| 2014/0040671 | A1* | 2/2014 | Akirav | G06F 11/0778 714/45 |
| 2015/0149830 | A1* | 5/2015 | Escobar Olmos | G06F 11/0706 714/38.11 |
| 2016/0283301 | A1* | 9/2016 | Govindarajalu | G06F 11/079 |
| 2017/0192833 | A1* | 7/2017 | Gschwind | G06F 11/0721 |
| 2018/0260270 | A1* | 9/2018 | Kucera | G06F 11/0778 |

FOREIGN PATENT DOCUMENTS

WO   WO-2010050944 A1   5/2010

OTHER PUBLICATIONS

Fred Knight, "SPC-4—Device Crash Dump", To: INCITS Technical Committee T10, May 25, 2011, 9 pages.
Wikipedia, "Core dump", available online at <https://en.wikipedia.org/w/index.php?title=Core_dump&oldid=868247587>, Nov. 11, 2018, 5 pages.

(Continued)

*Primary Examiner* — Joseph D Manoskey
(74) *Attorney, Agent, or Firm* — Hewlett Packard Enterprise Patent Department

(57) ABSTRACT

Aspects pertaining to a crash dump file are described. In an example, the crash dump file may include one or more sections within which crash-related data is stored. A content file is also described which records valid parameters, wherein the valid section parameters pertain to corresponding sections within the crash dump file.

19 Claims, 7 Drawing Sheets

(56) References Cited

OTHER PUBLICATIONS

Bailey et al., "Using RPM to Verify Installed Packages," Mar. 17, 2018, Maximum RPM: Taking the RPM Package Manager to the Limit, Chapter 6, <https://web.archive.org/web/20180317211956/http://ftp.rpm.org/max-rpm/ch-rpm-verify.html>.

Riley, S., "How to Verify the Integrity of a Dump File," Oct. 18, 2018, https://support.tibco.com/s/article/How-to-verify-the-integrity-of-a-dump-file.

\* cited by examiner

| seqNo | Memory offset | Range | Size | SHA2-checksum | startMarker | endMarker |
|---|---|---|---|---|---|---|
| 1 | 0x000 – 0x1000000 | 0-1MB | 1MB | ba781a39617 7a9 | <1K long string from start of section> | <1K long string at end of section> |
| | 1) Backtrace  2) CPU registers  3) Timers | | | | | |
| 2 | 0x1000000– 0x8000000 | 1MB-1GB | ~1GB | axcdhba78177 a9 | <1K long string from start of section> | <1K long string at end of section> |
| | 1) RAM or CMP memory offset ranges  2) I/O queue offsets ranges | | | | | |
| ... | | | | | | |
| ... | | | | | | |
| 45 | 0x1000000– 0x8000000 | 28GB-29GB | 1GB | klpahba78177 a9ca | <1K long string from start of section> | <1K long string at end of section> |
| | 1) Stack  2) Queues  3) Timers  4) Process table area  5) Open file table maps  6) Networking IPs, routing table info | | | | | |
| ... | | | | | | |
| 88 | | | | | <1K long string from start of section> | <1K long string at end of section> |

FIG. 3

SECTIONS IN CRASH DUMP FILES

BACKGROUND

Computing systems may experience certain unexpected interruptions, as a result of which the computing system may crash. Such interruption may arise either due to faulty hardware or a software. In the event of a computing system crashing, the contents of the memory of the computing system are retrieved and separately retained as a crash dump file. The crash dump file may be subsequently analyzed for determining causes which may have resulted in the system crash. To such an end, the crash dump file may be transmitted to another system where a debugging tool may analyse the crash dump file. In some case, the crash dump file may get corrupted. Corruption may prevent such debugging tool to adequately analyse the crash dump file to ascertain the cause behind the system crashing.

BRIEF DESCRIPTION OF FIGURES

Systems and/or methods, in accordance with examples of the present subject matter are now described, by way of example, and with reference to the accompanying figures, in which:

FIG. 3 illustrates a format of a content file, in accordance with an example of the present subject matter

DETAILED DESCRIPTION

Figure 1:
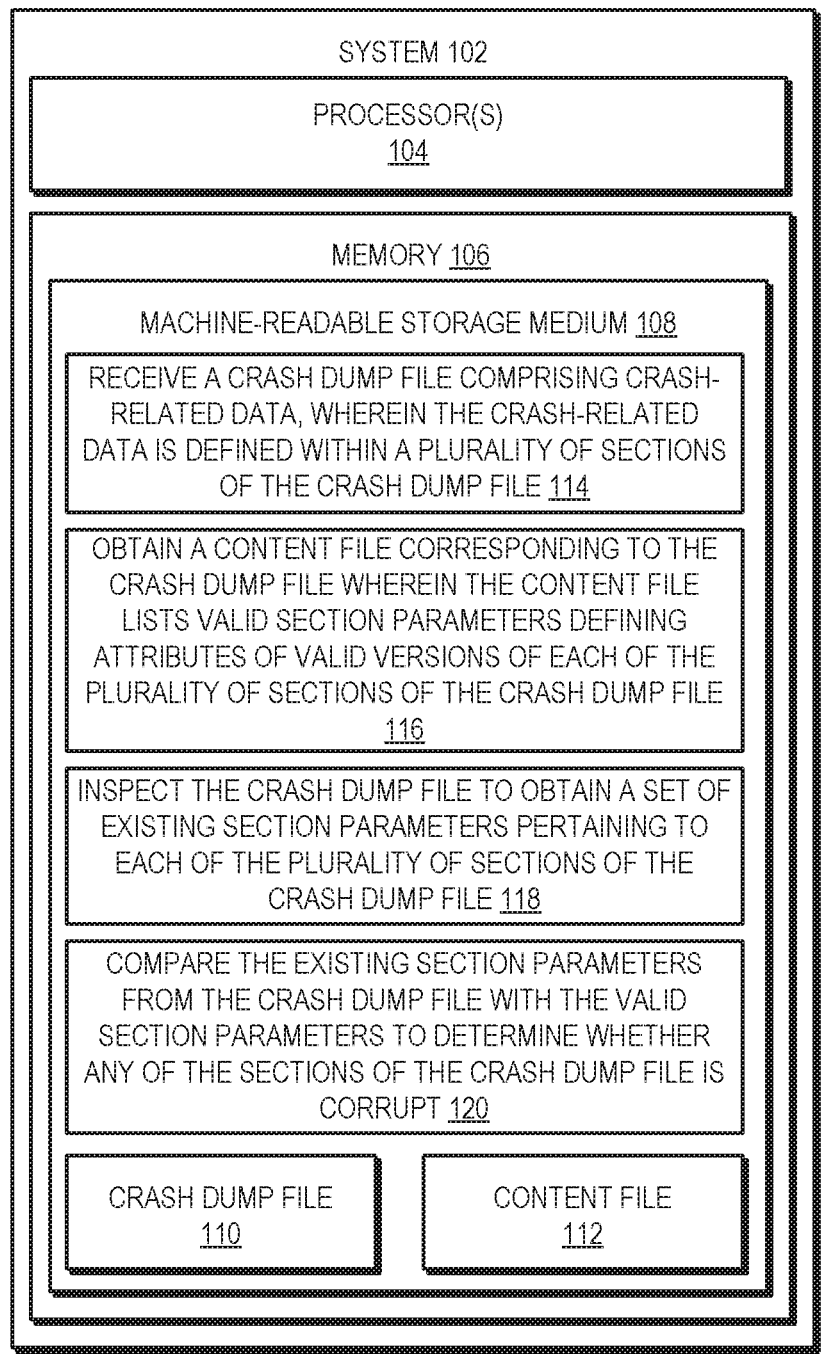
FIG. 1 illustrates a system setup for examining sections of a crash dump file, in accordance with an example of the present subject matter.

Any computing system may generally experience unexpected interruptions which may occur during its otherwise normal operation. In certain cases, such interruptions may result in the application operating abnormally and terminating abruptly. In cases where the application is a core part of the operating system, the computing system may crash or become unresponsive (or 'hangs'). To determine the causes which may have resulted in the computing system crashing, contents which were present in the memory of the computing system are determined and retained as a file, which is commonly referred to as the crash dump file. Examples of such computing system include, but are not limited to, desktops, laptops, mobile computing devices, servers, storage arrays, and the like. The crash dump file may be subsequently transmitted to another computing system and processed to identify the causes that may have resulted in the system crash.

The crash dump file, in some instances, may get corrupted. The corruption of the crash dump file may occur, for example, at the time the crash dump file is being written when a program to generate the crash dump file itself prematurely exits. Other circumstances which may result in the corruption of the crash dump file include transmission of the crash dump file to another system for analysis. Corruption of the crash dump file may also be broadly categorized as a total corruption or a partial corruption. In the former case, headers and important data sections of the crash dump file are corrupted rendering the crash dump file of no use for the purposes of determining the cause of the crash of the computing system. In cases of a partial corruption, certain data sections of the crash dump file may get corrupted. In such cases where certain data sections have been corrupted, other data sections may still be used for assessing the causes of the computing system crash.

Certain other circumstances may also arise, which may result in the crash dump file being partially written or truncated. For example, in certain cases, the volume of space available on storage volume may not be sufficient to fully accommodate the entire crash-related data. In such cases, not all crash-related data is written to the crash partition, with certain amount of the crash-related data being irretrievably lost. The crash dump file which was created based on the remaining crash-related data, in such cases, is said to be truncated. In some instances, it may also not be possible to ascertain that such a truncation has occurred. Even if it is known that truncation has occurred, the debugging administrator may not be aware as to the type of crash-related data that was irretrievably lost. Therefore, even if such a truncated crash dump file is processed, the outcome may not be determinative of the probable causes of the system crash.

In some examples, in the context of storage arrays, information which is written into the crash dump file may be prioritized such that certain types of crash-related data are written prior to other types. For example, information pertaining to CPU registers, file handles, etc., which may be utilized by crash tools for assessing the cause of the computing system crash, may be written to the crash dump file prior to portions which include user data, such as RAM data, cache memory pages (CMP), etc., which may be of limited use for the purpose of determining probable cause of a system crash. Therefore, even in the event of a truncation due to which user data is lost or not written, it is possible that the prior portions of the crash dump file (which included information pertaining to CPU registers, file handles, etc.) are still available. To such an extent, the crash dump file may still be processed for determining the probable causes of a system crash. As a result, impact due to truncation of the crash dump file may be reduced to an extent. Other approaches have involved compressing crash dump files, adding larger drives, allocating larger sizes for partitions for storing crash dump files, and such. However, despite such mechanisms, determining which data section of the crash dump file has been corrupted and also determining contents of such corrupted data sections (which now are no longer processable or irretrievably lost) poses challenges.

Examples described herein relate to approaches for determining which sections of a crash dump file have been corrupted. In some examples, the contents or the type of information within such sections that may have been impacted by corruption of the crash dump file, may also be determined.

In operation, a crash dump file is created on the computing system encountering an unexpected interruption or a crash. The crash dump file includes crash-related data pertaining to the state of the memory of a computing system when the computing system had crashed. In one example, the crash dump file thus created, is such that it defines a plurality of sections. Each section may be considered as a portion which includes certain type of crash-related information obtained from the memory of the computing system. Such information may be utilized for determining the cause of the crash.

As the crash dump file is being created, section parameters corresponding to each section are determined. In an example, information pertaining to the contents, i.e., the crash-related data within each section of the crash dump file, is also determined. The parameters corresponding to each section and information pertaining to the crash-related data within each section are written to a content file. In the event of a corruption of the crash dump file, the sections may undergo a change from their otherwise valid versions. Since the crash dump file, thus generated, has not yet been processed, transmitted, or otherwise handled in any manner, it may be considered that the version of the plurality of section are valid. To such an extent, the parameters pertaining to such valid versions of each of the plurality of sections (referred to as valid sections) of the crash dump file are recorded as valid section parameters in the content file. Examples of section parameters include, but are not limited to, start markers and end markers which indicate a starting boundary and a terminating boundary of such valid section, boundary offsets, section size, and a checksum for each section. It may be understood that other examples of such parameters may also be utilized without deviating from the scope of the present subject matter.

Once the crash dump file and the content file are obtained, the same may be transmitted to another system for debugging. It is possible that during transmissions, one or more sections from amongst the plurality of valid sections may get corrupted. In an example, a debugging tool may be utilized to determine whether the transmitted crash dump file is corrupt based on the content file. To this end, each of the plurality of existing sections within the transmitted crash dump file may be scanned to determine corresponding existing section parameters. For a given existing section, which may be one of the plurality of existing sections, the existing section parameters are compared with corresponding valid section parameters (of a corresponding valid section) recorded in the content file. If the comparison reveals a mismatch, the given section is identified as corrupt. Similarly, a match between the section parameters and the valid section parameters would indicate that the section under consideration is valid.

As per the approaches discussed above, the valid section parameters recorded in the content file may be compared with appropriate existing section parameters for all the existing sections within the transmitted crash dump file. Based on the comparison, the corrupted sections within the crash dump file may be identified. Once all existing sections of the crash dump file have been examined, a debugging administrator may accordingly assess whether the crash dump file may be used to determine probable causes for computing system crash. To such an end, the debugging administrator may determine the contents of the corrupted section which may have been affected by the corruption of the crash dump file based on the corresponding information recorded in the content file. Depending on the nature of the crash-related data which had been rendered unusable as a result of the crash, the debugging administrator may further assess whether the crash dump file need be analyzed at all.

In yet another example, the content file may be utilized for recording information pertaining to the crash-related data which may have been lost in the event that the crash dump file got truncated. Truncation of crash dump file may occur in instances when the size of available space in a crash partition (e.g., a storage volume for recording the crash-related data) is not sufficient to hold the entire crash-related data. In some examples, the crash partition may in turn be further partitioned into a fixed partition and a rolling partition. Initially, a first portion of the crash-related data is written onto the fixed partition. Of the remaining crash-related data, a second portion of the crash-related data is written onto the rolling partition. Thereafter, a subsequent portion of the crash-related data is written onto the rolling partition by overwriting the previously written portion in the rolling partition. As each section, say a valid section, is being written to the fixed partition or the rolling partition, valid section parameters pertaining to the valid sections being written are determined and are recorded in the content file. In this manner, even if the prior portions (and hence their constituent sections) have been overwritten, the valid section parameters and information pertaining to such valid sections is recorded in the content file.

The above approaches assist in ascertaining whether the crash dump file has been truncated or that whether any section within the crash dump file has been corrupted based on the valid section parameters recorded in the content file. Relying on the above-described approaches, information which otherwise would not have been available in the event of a partial corruption or truncation of the crash dump file may be determined, thereby enhancing the reliability of the debugging process.

The above examples are further described in conjunction with appended figures. It should be noted that the description and figures merely illustrate the principles of the present subject matter. It will thus be appreciated that various arrangements that embody the principles of the present subject matter, although not explicitly described or shown herein, may be devised from the description and are included within its scope. Moreover, all statements herein reciting principles, aspects, and examples of the present subject matter, as well as specific examples thereof, are intended to encompass equivalents thereof.

In the figures, the left-most digit(s) of a reference number identifies the figure in which the reference number first appears. The same numbers are used throughout the figures to reference like features and components.

FIG. 1 illustrates an example system 102 for assessing corruption of a crash dump file, in accordance with an example of the present subject matter. The system 102 includes a processor 104, and a machine-readable storage medium 106 coupled to and accessible by the processor 104. The system 102 may be implemented in any computing system, such as a storage array, server, desktop or a laptop computing device, a distributed computing system, or the like. In an example, the system 102 may be a debugging system for processing and analysing a crash dump file received from another computing system which may have experienced a system crash. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include any non-transitory computer-readable medium including, for example, volatile memory such as RAM, or non-volatile memory such as EPROM, flash memory, and the like.

The processor 104 may fetch and execute instructions 108 to determine whether a crash dump file, stored as crash dump file 110 in the machine-readable storage medium 106 is corrupt. The crash dump file 110 may be obtained from another computing system (not shown in FIG. 1) which may have crashed. As discussed briefly, a dump file is generated on a computer system having experienced a system crash. Thereafter, the dump file may be transmitted and stored in debugging system, such as the system 102. In certain cases, the crash dump file 110 may have corrupted. In an example, the system 102 may ascertain whether the crash dump file 110 is corrupt based on a content file 112 which is also stored in machine-readable storage medium 106. The crash dump file 110 may be understood as including crash-related data which may have been generated when a computing system (distinct and separate from the system 102) had experienced a crash.

The crash dump file 110 may be generated by obtaining contents of a main memory of the computing system, pertaining to the state of its memory when it crashed. In an example, the crash-related data within the crash dump file 110 may be in a data structure or sections. Each section may be considered as a portion which includes certain type of crash-related information obtained from the memory of the computing system. In an example, as the crash dump file 110 is being created or written, a corresponding content file 112 is also created. The content file 112, may among other things, record parameters corresponding to each section within the crash dump file 110, as valid section parameters. Examples of valid section parameters include, but are not limited to, start markers, end markers, boundary offsets, section size, and a checksum for each section. In addition, the content file 112 may also record information pertaining to the crash-related data within each section. The crash dump file 110 and the content file 112 may be subsequently transmitted to another remote system, such as the system 102, for debugging, where it may be stored in the machine-readable storage medium 106.

In operation, the processor 104 may fetch and execute instructions 108 to process and analyse the crash dump file 110 based on the content file 112, as is described in the following sections. In one example, the instructions 108 may further include instructions 114 to receive crash dump file 110 from the machine-readable storage medium 106. The crash dump file 110 may in turn include crash-related data defined in sections. In a similar manner, the instructions 108 may further include instructions 116 to obtain content file 112 from the machine-readable storage medium 106. The content file 112 lists one or more valid section parameters. The valid section parameters define attributes of valid versions of each of the plurality of sections of the crash dump file 110 prior to being received and stored within the machine-readable storage medium 108. In an example, the crash dump file 110 and the content file 112 may be obtained from the computing system that had crashed or from an external repository which is in communication, through a wired or wireless network, with the system 102.

Once the crash dump file 110 and the content file 112 are obtained, instructions 118 may be further executed to inspect the crash dump file 110 in order to determine a set of existing section parameters for a given section within the crash dump file 110 to ascertain whether the given section has been corrupted from its other valid version. In one example, the existing section parameters may be one of address markers, section markers and checksum.

The instructions 108 may further include instructions 120 which when executed, compare the set of the existing section parameters obtained from the crash dump file 110 with corresponding valid section parameters recorded within the content file 112. Based the comparison of the existing section parameters obtained from the crash dump file 110 and the valid section parameters from the content file 112, the processor 104 may determine whether the crash dump file 110 being processed is corrupt or not. For example, if based on the comparison it is determined that the section parameters and the valid section parameters do not match, the processor 104 may provide an indication noting that the section under consideration is corrupt. However, if the section parameters and the valid section parameters match, it may be concluded that the section is valid. In this manner, all sections within the crash dump file 110 may be inspected to determine, whether the inspected sections have been corrupted or not. In some examples, all sections being determined to be valid indicates that the entire crash dump file 110 is valid. However, the presence of any one section which has been corrupted may indicate that the crash dump file 110 is corrupt and may require further intervention by a debugging administrator to assess whether the crash dump file 110 under consideration may be used for determining probable causes of the system crash.

In the manner as described above, the crash dump file 110 may be analyzed based on the content file 112 to determine whether it is corrupt. Furthermore, in case certain sections of the crash dump file 110 are corrupt, the content file 112 may be utilized for determining the contents of such corrupt sections. For example, the processor 104 may retrieve information recorded in the content file 112 corresponding to the corrupt section. Based on the information, a debugging administrator may assess whether crash-related data within the corrupt section could have indicated the cause of the computing system crash. It may be noted that above approaches are provided in conjunction with few examples. However, the scope of the present subject matter should not be restricted to only said examples. The other examples and additional aspects are further described in conjunction with the remaining figures.

Figure 2:
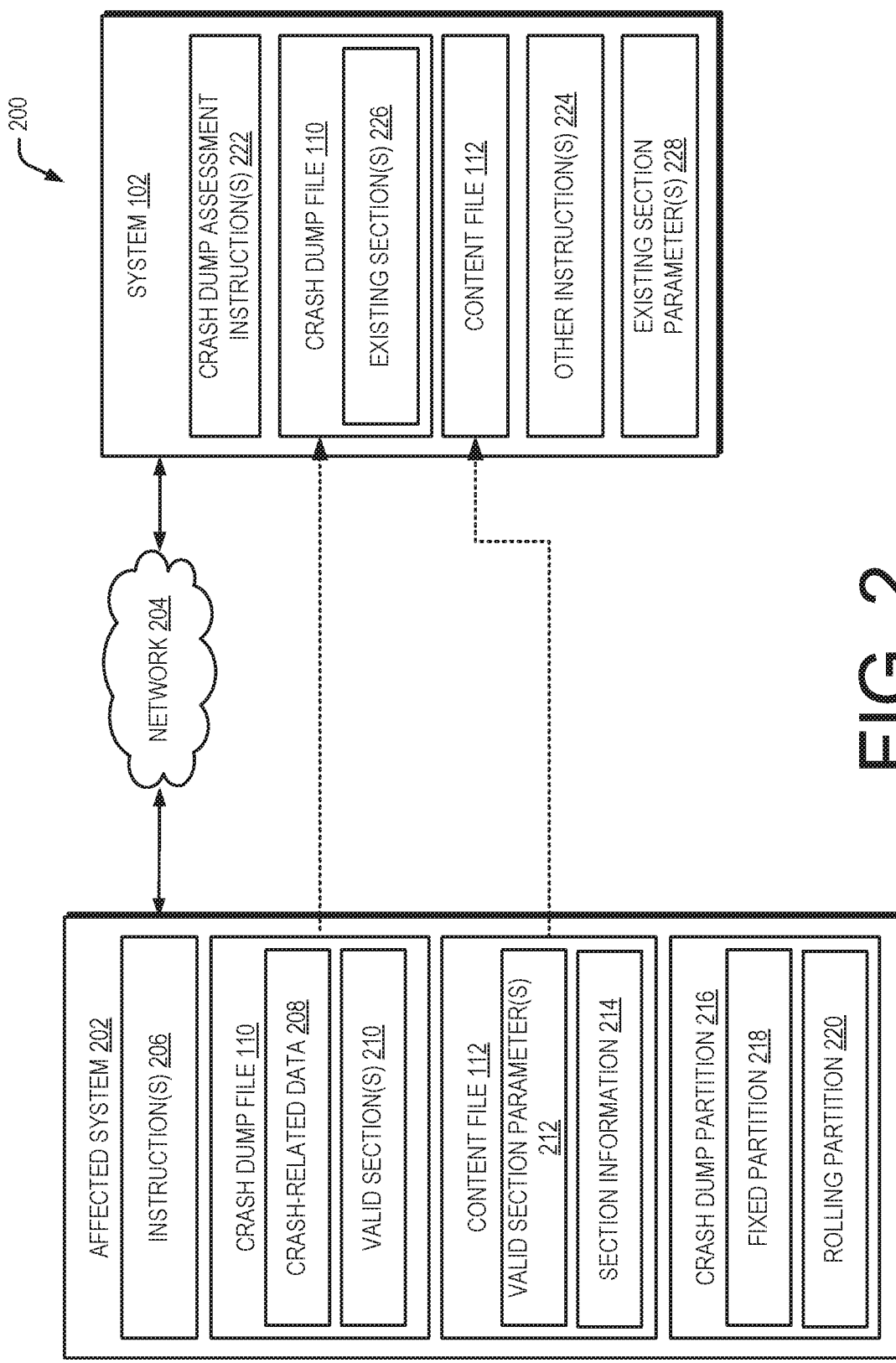
FIG. 2 illustrates a network environment for assessing sections of a crash dump file, in accordance with an example of the present subject matter.

FIG. 2 illustrates a network environment 200 for assessing a crash dump file, in accordance with an example of the present subject matter. The network environment 200 includes an affected computing system 202 having experienced a system crash, which may have resulted owing to a hardware or software executing in an unexpected manner. In the event of a system crash, the affected computing system 202 (referred to as the affected system 202) may generate a crash dump file 110. The crash dump file 110 in turn may need to be further processed for determining causes which may have resulted in the system crash. To this end, the affected system 202 may be communicatively coupled with system 102, to which the crash dump file 110 may be transmitted. In an example, the system 102 may further process the transmitted crash dump file 110 to assess whether the crash dump file 110 has been corrupted. The corruption to the crash dump file 110 may have happened during a period the crash dump file 110 was being retained within the affected system 202 or during the transmission of the crash dump file 110 to the system 102.

In an example, the affected system 202 may be in communication with the system 102 through a network 204. The network 204 may be a private network or a public network and may be implemented as a wired network, a wireless network, or a combination of a wired and wireless network. The network 204 may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The affected system 202 may further include instructions 206 for generating a crash dump file 110 and a content file 112. In an example, the instructions 206 are fetched from a memory and executed by a processor included within the system 202. In the context of the present subject matter, the instructions 206 may be executed in the event of the affected system 202 crashing. When the affected system 202 experiences a crash, entire contents of the main memory of the affected system 202 are obtained. The contents of the main memory are indicative of the state of the affected system 202 when it crashed. The contents are written to the crash dump file 110 and is available as crash-related data 208.

The crash-related data 208 may provide different types of crash-related information. For example, certain data may represent the state data of the affected system 202 which may be considered to be useful for determining the cause of unexpected failures. On the other hand, the crash-related data 208 may also include user data. Examples of such user data include, but are not limited to, offsets of RAM data and cached memory pages. Such data when processed, may not be useful for determining the probable cause behind the crash of the affected system 202. In an example, the crash-related data 208 within the crash dump file 110 is defined as a plurality of section(s) 210. The section(s) 210 may be defined based on the type of the data or based on any other consideration, by virtue of which portions of the crash-related data 208 may be grouped into section(s) 210 with logical boundaries. Each of the section(s) 210 may be of different sizes. In this manner, the crash dump file 110 may be written. For the purposes of the present example, since the crash dump file 110 has not yet been processed, transmitted, or otherwise handled in any manner, it may be considered that the versions of the plurality of section storing the crash-related data are valid. For the purposes of the present description, such sections are referred to as valid section(s) 210.

As the crash dump file 110 is created by the affected system 202, the instructions 206 may further execute to create a corresponding content file 112. In an example, the instructions 206 may further enable determination of a plurality of section parameters corresponding to each section being written in the crash dump file 110. The parameters may be considered as one or more attributes for each section within the crash dump file 110. Examples of such parameters include, but are not limited to, start markers, end markers, boundary offsets, section size, and a checksum for each section. It may be noted that the aforesaid examples are only indicative and should not be considered as limiting the scope of the present subject matter.

Once determined, the section parameters for each section, i.e., the valid section(s) 210, within the crash dump file 110 are recorded in the content file 112 as valid section parameter(s) 212. The valid section parameter(s) 212 recorded in the content file 112 correspond to their respective valid section(s) 210 within the crash dump file 110. In an example, information describing the type of data within each of the valid section(s) 210 is also recorded in the content file 112 as section information 214. For example, the section information 214 may specify that a corresponding section from amongst section(s) 210 includes data pertaining to the CPU registers, backtrace data, timer data, etc. In an example, the section information 214 may be linked to the corresponding valid section parameter(s) 212.

With the crash dump file 110 and the content file 112 being generated, the same may be transmitted to system 102 for assessment to determine the probable causes which may have resulted into the crash of the affected system 202. In an example, the affected system 202 may perform a variety of checks to assess whether the crash dump file 110 had been generated completely, before it is transmitted to the system 102. It may be the case that the instructions 206, based on the execution of which the crash dump file 110 is being written, encounter an error and exits before all the contents of the memory are retrieved and written to the crash dump file 110. To this end, one of the instructions 206 may determine whether all contents of the memory of the affected system 202 have been retrieved and the crash-related data 208 has been written to the crash dump file 110. For such cases, in an example, the instructions 206 may annotate the content file 112 with a start tag when the crash dump file 110 is created. As the crash-related data 208 is completely written to the crash dump file 110, the instructions 206 may annotate the content file 112 with an end tag. Therefore, if the instructions 206 writing the crash dump file 110 were to have abruptly aborted, the content file 112 would not be annotated with the end tag.

Once the crash dump file 110 is generated, the instructions 206 may be executed to assess whether the crash dump file 110 thus created is complete based on the presence of an end tag. In an example, the instructions 206 when executed determine whether the content file 112 includes a start tag and a corresponding end tag. On determining that an end tag is present, the affected system 202 may notify that the crash dump file 110 thus obtained is valid and was completely written. However, in case it is determined that the end tag is not present in the content file 112, the affected system 202 may notify that the process for writing the crash dump file 110 was aborted abruptly. In this manner, the crash dump file 110 may be checked for determining whether the crash dump file 110 was completely written or not, before it is transmitted to the system 102 for further processing. Accordingly, a debugging administrator may ascertain whether the crash dump file 110 is to be further processed or not by the system 102.

The crash dump file 110 is written onto a crash dump partition 216 provided within the memory (not shown in FIG. 2) of the affected system 202. In certain cases, the size of the crash dump partition 216 may not be sufficient to entirely accommodate the crash-related data 208. In such instances, writing the crash dump file 110 into the crash dump partition 216 may result in the crash dump file 110 getting truncated.

For such cases, in an example, the affected system 202 may compare the size of the crash-related data 208 and the storage volume of the crash dump partition 216. In case that the size of the crash-related data 208 is greater than the storage volume of the crash dump partition 216, the affected system 202 may further partition the crash dump partition 216 into a fixed partition 218 and a rolling partition 220. The size of the fixed partition 218 and the rolling partition 220 may be such that the size of the fixed partition 218 is greater than the size of the rolling partition 220.

Once the crash dump partition 216 is partitioned, the affected system 202 may commence writing the crash-related data 208. Initially a portion of the crash-related data 208 is written completely into the fixed partition 218. The portion which is written to the fixed partition 218 in turn may include one or more valid section(s) 210. Thereafter, another portion of the remainder of the crash-related data 208 is written into the rolling partition 220. Such smaller portions may also include a certain (although small) number of valid section(s) 210. Subsequent portions of the remaining crash-related data 208 are then written onto the rolling partition 220 by over-writing the previously crash-related data 208 in the rolling partition 220.

As each portion (and consequently various valid section(s) 210) are being written, the instructions 206 may result in determining one or more corresponding valid section parameters. The section parameters thus determined may then be recorded into the content file 112 as valid section parameter(s) 212. In a similar manner, for the subsequent portions, the instructions 206 may result in determining information pertaining to the crash-related data 208 included in the section(s) 210 under consideration. Thereafter, information (i.e., the section information 214) is recorded into the content file 112. It may be noted that the section information 214 pertaining to the valid section(s) 210 is recorded in the content file 112 despite the certain smaller portions of the crash-related data 208 being overwritten by subsequent portions. Therefore, information pertaining to portion of the crash-related data 208 which got overwritten is captured and retained in the content file 112. Such information may then be utilized by a debugging administrator to assess whether the crash dump file 110 (albeit in truncated form) is usable for further assessment as to the probable cause of the crash of the affected system 202.

The above mechanism is further explained in conjunction with the following example. It may be noted that the present example is only illustrative and is one of the many other possible examples. The same should not be considered as limiting the scope of the present subject matter. In the present example, the size of the crash dump partition 216 is 32 GB and the size of the crash-related data 208 is 40 GB. The instructions 206 may result in partitioning the crash dump partition 216 into fixed partition 218 of 30 GB and a rolling partition 220 of 2 GB. Thereafter, about 30 GB of the crash-related data 208 is written onto the fixed partition 218. Of the remaining 10 GB, about 2 GB of the crash-related data 208 is written onto the rolling partition 220. At this stage, section information 214 pertaining to the valid section(s) 210 written into the fixed partition 218 and the rolling partition 220 is determined and recorded into the content file 112. Thereafter, another 2 GB of crash-related data 208 is written onto the rolling partition 220 by overwriting 2 GB of crash-related data 208 which was previously written into the rolling partition 220. As each of the remaining portions of the crash-related data 208 are written into the rolling partition 220, the instructions 206 may result in determining section information 214 of the corresponding section(s) 210 which are written onto the rolling partition 220. The determined section information 214 may then be recorded into the content file 112. In the context of the present example, the remaining of the crash-related data 208 would be written/rewritten in five cycles before the entire volume of the crash-related data 208 has been written into the crash dump partition 216.

In an example, a count value may be determined based on the number of times the rolling partition 220 is rewritten. Based on the count value, a size of crash-related data 208 which has been lost due to the truncation may be estimated. In such a manner, a debugging administrator may be in a position to ascertain whether the crash dump file 110 thus obtained is truncated or not. Furthermore, the debugging administrator may also determine, in the event that the crash dump file 110 is truncated, the crash-related data 208 which may have been lost owing to the truncation. Assessment into the crash-related data 208 which is lost may provide further insights to the debugging administrator as to whether the crash dump file 110 may be further utilized for determining the probable cause of the system crash.

Once the crash dump file 110 and the content file 112 are generated, they may be transmitted to the system 102, wherein the crash dump file 110 may be further processed to assess probable causes behind the crash of the affected system 202. The content file 112 and the crash dump file 110 may be transmitted over the network 204. The transmission from the affected system 202 to the system 102 may be either initiated through a command from a debugging administrator or may be triggered when the crash dump file 110 is generated. In an example, a checksum corresponding to the content file 112 may be determined and also transmitted along with the crash dump file 110 and the content file 112.

As mentioned previously, it is possible that the crash dump file 110 may get corrupted either before or during the course of transmission to the system 102. In an example, the system 102 may, in addition to process the crash dump file 110 to assess probable causes behind the crash of the affected system 202, may also process the crash dump file 110 to determine whether the crash dump file 110 has corrupted during transmission. Corruption of the crash dump file 110 may entail instances in which single or a set of bits in any one of the valid section(s) 210 change. In another instance, certain bits in any of the valid section(s) 210 may get deleted during transmission, and in certain other instances it may get added. In any case, alterations in the one or more bits change various attributes of the section(s) 210 themselves. The corruption of the crash dump file 110 may occur either while writing the crash-related data 208 into the crash dump file 110 (e.g., by the affected system 202) or during transmission to the system 102.

In an example, the system 102 may further include crash dump assessment instruction(s) 222 (hereinafter referred to as assessment instruction(s) 222) and other instruction(s) 224, which may be executed by a processing resource (e.g., processor 104). The crash dump file 110 and the content file 112 may be received by the system 102. Once received, the crash dump file 110 and the content file 112 may be stored in a memory (e.g., memory 106). On the other hand, the content file 112 stored within the system 102 further includes the valid section parameter(s) 212 and the section information 214.

As mentioned previously, in certain cases the sections of the crash dump file 110 may have been corrupted and may have to be further assessed. To such an end, the sections within the crash dump file 110 present in the system 102 are referred to as existing section(s) 226. Returning to the present example, for examining the crash dump file 110, one or more of the assessment instructions 222 may be executed by the processing resource within the system 102. As a result of the execution of the assessment instruction(s) 222, the system 102 may fetch the crash dump file 110 and the content file 112 from the memory of the system 102. The crash dump file 110 may be then subsequently inspected to obtain a set of section parameters of the existing section(s) 226, with the parameters being stored as existing section parameter(s) 228. The system 102 may further process the content file 112 to determine one or more valid section parameter(s) 212 recorded therein. In an example, the assessment instruction(s) 222 may result in parsing of the content file 112 to determine the valid section parameter(s) 212.

Once obtained, the system 102, in response to the execution of the assessment instruction(s) 222, may compare the existing section parameter(s) 228 with the valid section parameter(s) 212 recorded in the content file to examine whether the crash dump file 110 is corrupt. In an example, a match between the existing section parameter(s) 228 (generated on receipt by the system 102) and the valid section parameter(s) 212 implies that no corruption of the crash dump file 110 has occurred since its generation by the affected system 202.

On the other hand, for any one of the section(s) 210, a mismatch between any one of the existing section parameter(s) 228 and the valid section parameter(s) 212 indicates that some bits of the crash dump file 110 may have changed, i.e., the crash dump file 110 is no longer valid and has corrupted. The above-mentioned examination may be performed for each of the section(s) 210. In an example, only on determining that all the existing section parameter(s) 228 for each section(s) 210 matches with the corresponding valid section parameter(s) 212 recorded in the content file 112, may the system 102 indicate that the crash dump file 110 is valid and has not corrupted. As noted previously, examples of such existing section parameter(s) 228 and/or valid section parameter(s) 212 include but are not limited to start markers, end markers, boundary offsets, section size, and a checksum value for each section.

In relation to such example, the system 102 may determine the start markers and end markers, section size, and a checksum value for each section. The various valid section parameter(s) 212 and section information 214 are explained through example content file 112 as depicted in FIG. 3.

The content file 112 comprises seqNo., memory offset, range, size, SHA2-checksum, startMarker and endMarker. In the example as illustrated, the first row provides a few example valid section parameter(s) 212 pertaining to the valid section(s) 210. It may be noted that the format of the content file 112 is only one of many other possible examples. The content file 112 may include additional or fewer parameters, without deviating from the scope of the present subject matter. In the context of the section parameters as depicted in FIG. 3, seqNo. may be a sequence or serial number of a given section. In an example, the seqNo. may be used as a section identifier. In the above diagram depicting the content file 112, each seqNo. corresponds to the information in its own row of the diagram, and to the following row. For example, each seqNo. may identify a given section and the row including the seqNo. may also include information such as the memory offset, range, size, SHA2-checksum, startMarker and endMarker for the given section identified by the seqNo.

The row following the row that includes the seqNo. may include section information 214 pertaining to the crash-related data 208 which was present in the given valid section(s) 210 for the given section identified by the seqNo. For example, for the given section identifiable by seqNo. 1, the row following the row including that seqNo. may include section information 214 that identifies that the crash-related data 208 within the given section pertains to "CPU registers," "timers," "backtraces," etc., at a time instant at about when the affected system 202 experienced a system crash.

Continuing with the present example, memory offset specifies the memory addresses within the crash partition between which the corresponding crash-related data 208 is stored. The range and the size provide an indication as to the range and size of the crash-related data 208 which is stored within the memory location as indicated above. The SHA2-checksum provides a checksum value of the crash-related data 208 which is stored within the given section (i.e., section with seqNo. 1) which may be obtained by any SHA2 based checksum algorithm (or any other type of checksum technique or the like). For each section, the startMarker is a record of data useable to identify the start of the section, such as a record of the actual content present at the start of the given section (e.g., the first 1 KB of the actual content of the section), and the endMarker is a record of data useable to identify the end of the section, such as a record of the actual content present at the end of the given section (e.g., the last 1 KB of the actual content of the section). Such start and end markers may be recorded, based on the actual data present at the respective start and end of a section, and thereafter used to identify the start and end of the section. In the example as indicated above, each startMarker and each endMarker may be represented by a 1 KB string value of actual content of the section, indicating the starting and terminating boundary of a valid section 210, respectively, although other amounts of data, other types of markers, or the like, may be used.

In an example, the values of the different valid section parameter(s) 212 may be determined at the time of generation of the crash dump file 110 pursuant to the execution of instruction(s) 206. While the crash dump file 110 is being created, the crash-related data 208 obtained from the memory of the affected system 202 is retrieved and scanned to determine the type of the crash-related data 208. As the crash-related data 208 is being written onto a crash dump partition (e.g., crash dump partition 216), the affected system 202 may note the memory offsets within which the crash-related data 208 is stored. In a similar manner, other attributes of the crash-related data 208 being saved in the different sections (e.g., valid section(s) 210) may be determined and recorded in the content file 112.

In an example, changes to any one of the above-mentioned parameters may indicate that the section to which such parameters pertain to, has been corrupted. For example, addition or deletion of one or more bits in the valid section(s) 210, may result in the start markers and end markers being displaced from their original section offsets, in the existing section(s) 226. In certain cases, the bits representing the start markers and end markers themselves may get altered or deleted. Additionally, in cases where the bits corresponding to the start marker and/or end marker itself changes, the start marker and end marker indicating the beginning and end of the one of the valid section(s) 210 may also get affected and may be lost. In instances where one or more bits are added onto the section(s) 210, the section boundaries of the corresponding existing section(s) 226 may get drifted and may get disrupted for most of the sections which follow the impacted section. In an example, a checksum value may be determined for each valid section(s) 210. In an example, the checksum may be determined based on an SHA2 algorithm or an MD5 message-digest algorithm, or via any other suitable technique, which may be recorded in the content file 112. The checksum value of a section may change in case the crash-related data 208 present in the section has altered in any manner.

The crash dump file 110 may then be further examined to determine existing section parameter(s) 228 which are then eventually compared with the corresponding valid section parameter(s) 212 recorded in the content file 112. For example, addition or deletion of one or more bits to one of the valid section(s) 210 may result in a change in the start marker and the end markers of a given section in the existing section(s) 226, when considered with respect to the valid start markers and the valid end markers of the one of the valid section(s) 210, prior to the corruption. Owing to corruption of one of the valid section(s) 210, existing start and end markers of the corresponding existing section(s) 226 would not match with the corresponding valid start and end markers as recorded in the valid section parameter(s) 212 in the content file 112.

In a similar manner, other type of section parameters may also be utilized for examining whether the crash dump file 110 has corrupted or not. For example, a valid checksum value recorded as valid section parameter(s) 212 for a given valid section from the valid section(s) 210, would not match with an existing checksum of such a corresponding existing section if the same has corrupted. In another example, any difference in size of the given valid section(s) 210 and a given existing section(s) 226 may also be utilized for determining whether any section within the crash dump file 110 within the system 102 has corrupted or not. Such a determination may be conducted for all existing section(s) 226 within the crash dump file 110 (stored in the system 102) to assess whether the crash dump file 110 is valid or not.

In another example, on determining that the crash dump file 110 is not valid, the execution of the instructions 206 may further result in determining the type of information that has been lost owing to the corruption of one of the section(s) 210. For example, for the system 102 may identify a section identifier (e.g., through 'seqNo' as noted in the example content file 112 depicted in FIG. 3) from the content file 112. Based on the section identifier, corresponding section information 214 is retrieved and provided. Based on the retrieved section information 214, a debugging administrator may ascertain the crash-related data 208 which is lost owing to the corrupted section, based on the section information 214.

In another example, the content file 112 may also be associated with a corresponding checksum value, which was determined at the time of generation of the content file 112. A further checksum value may again be determined by the system 102 on receipt of the content file 112. The original checksum value and the further checksum value of the content file 112 may be relied to determine whether the content file 112 itself has corrupted post-transmission from the affected system 202.

Based on the approaches as described above, the crash dump file 110 and the content file 112 may be examined to ascertain whether either the crash dump file 110 and/or the content file 112 has corrupted. Accordingly, a debugging administrator may then assess whether the crash dump file 110, as available, may be used for determining the probable cause for crash of the affected system 202.

Figure 4:
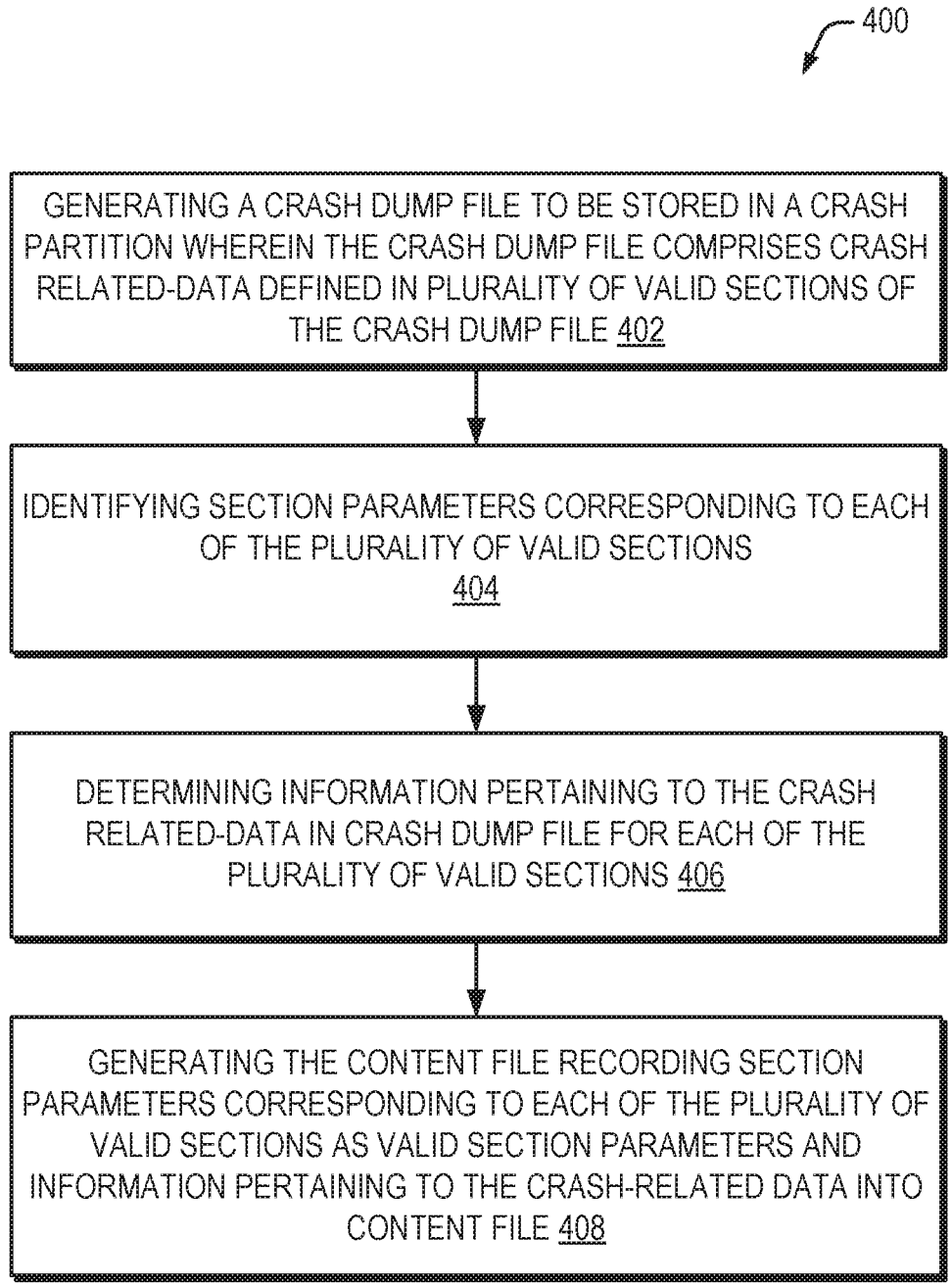
FIG. 4 illustrates a method for generating a crash dump file, in accordance with an example of the present subject matter.
Figure 5:
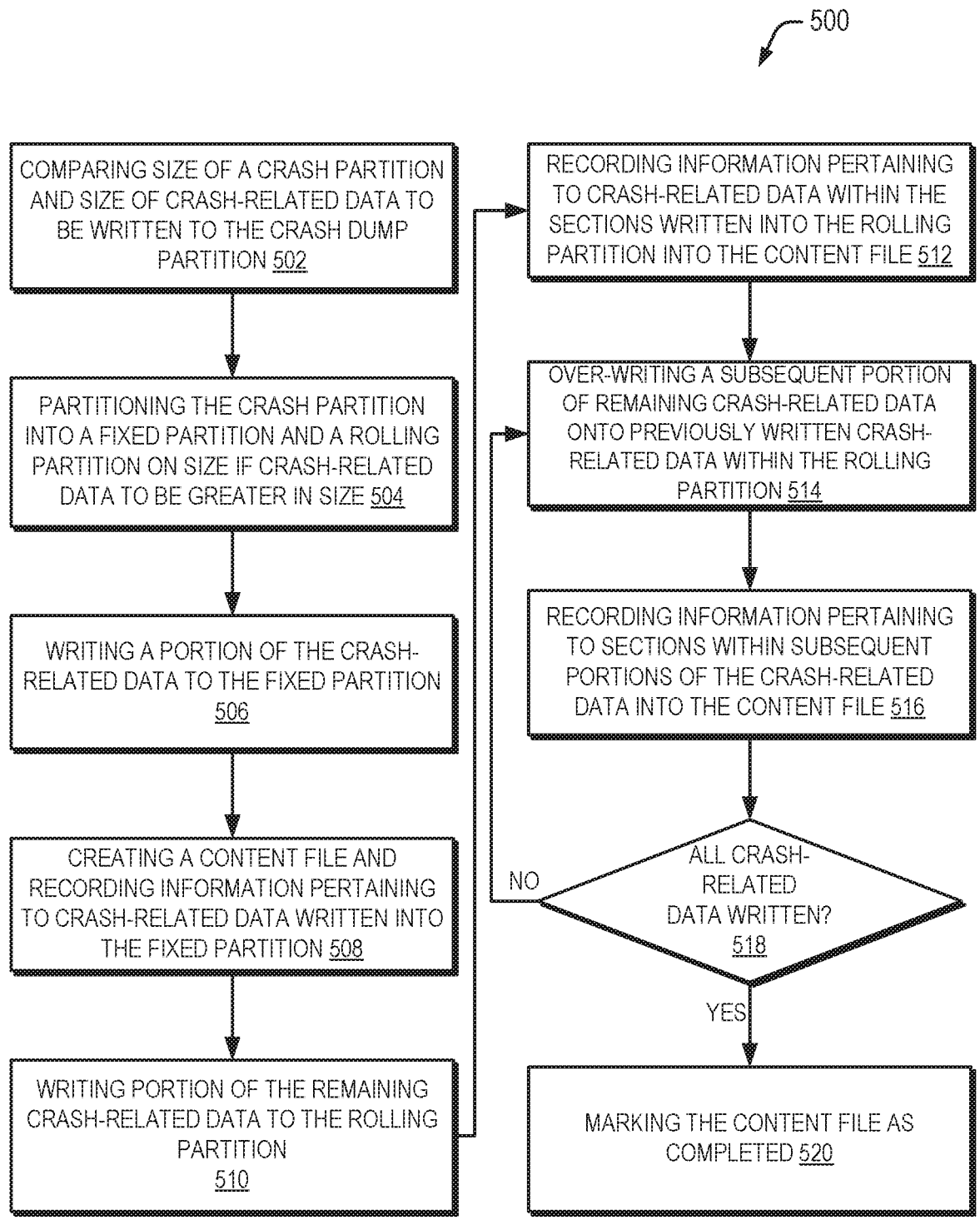
FIG. 5 illustrates a method for handling truncated crash dump file, in accordance with an example of the present subject matter.
Figure 6:
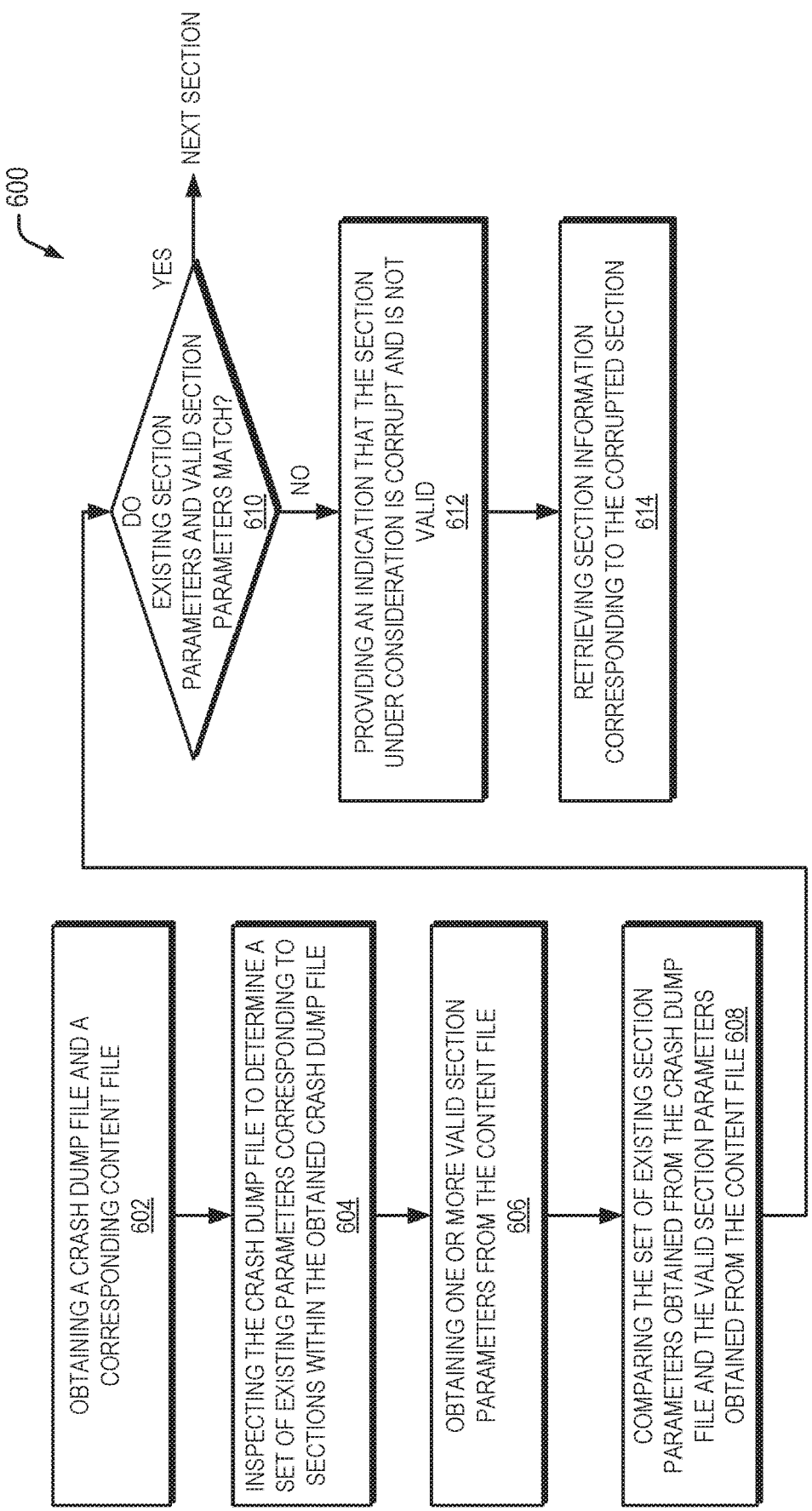
FIG. 6 illustrates a method for examining sections of a crash dump file, in accordance with an example of the present subject matter.
Figure 7:
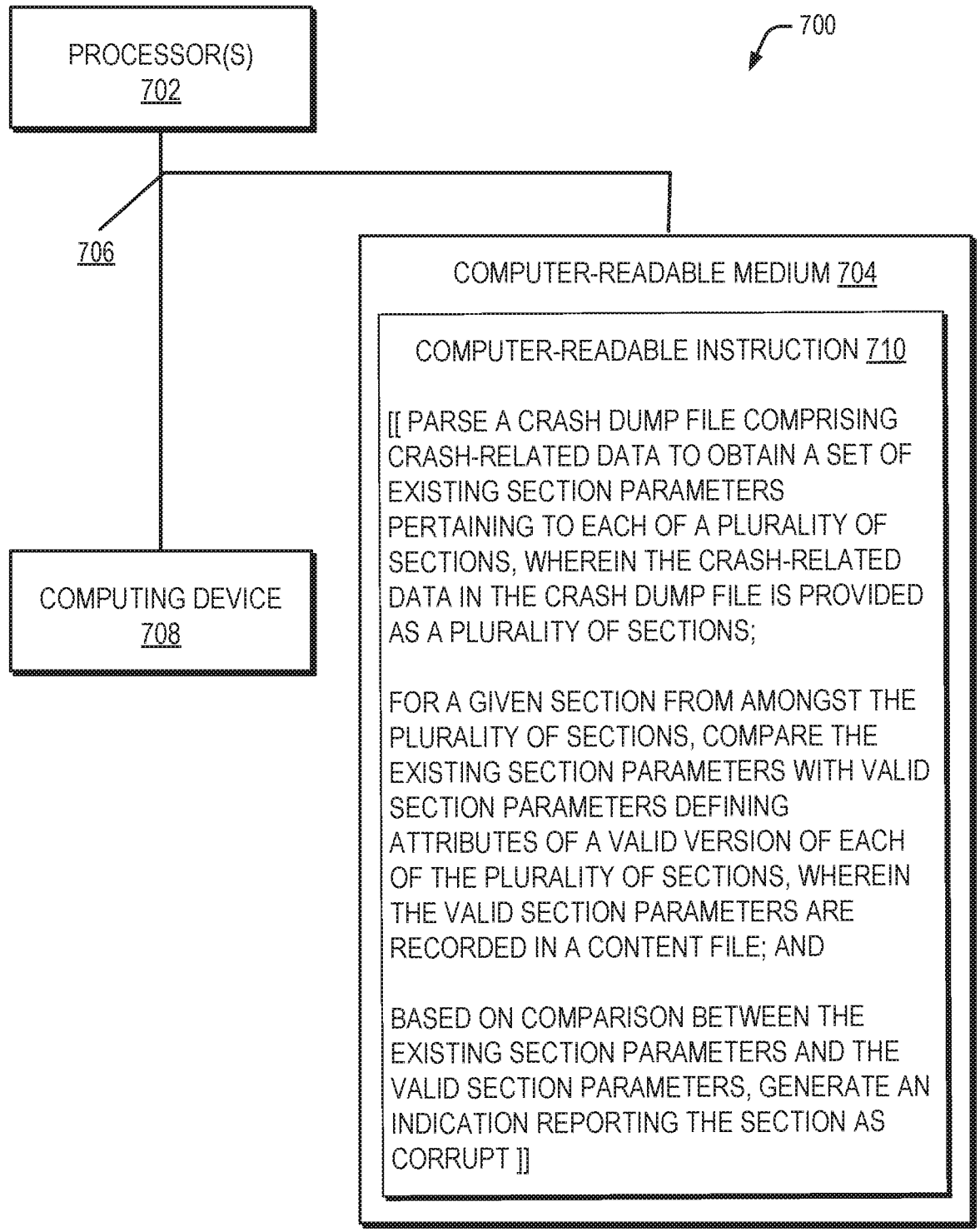
FIG. 7 illustrates a system environment implementing a non-transitory computer readable medium for examining sections of a crash dump file, according to an example of the present subject matter

FIGS. 4-6 illustrate example methods 400, 500, and 600 for generating a crash dump file and for examining the generated crash dump file to check whether the same is corrupt, in accordance with example implementations of the present subject matter. The order in which the above-mentioned methods are described is not intended to be construed as a limitation, and some of the described method blocks may be combined in a different order to implement the methods, or alternative methods.

Furthermore, the above-mentioned methods may be implemented in any suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by the one of systems 102 and system 202 in the network environment 200. Herein, some examples are also intended to cover non-transitory computer readable medium, for example, digital data storage media, which are computer readable and encode computer-executable instructions, where said instructions perform some or all of the steps of the above-mentioned methods.

In an example, the method 400 may be implemented by system which has experienced a crash, such as the affected system 202. With reference to method 400 (as illustrated in FIG. 4), at block 402, a crash dump file is generated and written to a crash partition. The crash dump file includes crash-related data which is defined in valid versions of the plurality of sections. Valid version of the sections (referred to as valid sections) may be understood as any section which has not changed or corrupted. For example, the system 202 which having experienced a crash, may generate a crash dump file 110. The crash dump file 110 may further include crash-related data 208 which is defined in one or more valid section(s) 210. The valid section(s) 210 may be based on the type of the data, by virtue of which portions of the crash-related data 208 may be grouped into valid section(s) 210 with defined logical boundaries. In an example, the section(s) 210 may be of different sizes.

At block 404, valid section parameters corresponding to each of the plurality of valid sections are identified. For example, the system 202 may determine one or more valid section parameter(s) 212 while writing the crash-related data 208 into the crash dump file 110. The valid section parameter(s) 212 may be one or more attributes for each valid version of the section within the crash dump file 110. Examples of such parameters include, but are not limited to, start markers, end markers, boundary offsets, section size, and a checksum for each section.

At block 406, information pertaining to the crash-related data in the crash dump file for each of the plurality of valid sections is determined. For example, the system 202 may determine information describing the type of data within each the valid section(s) 210. The information describing the type of data may be subsequently determined for all valid section(s) 210 within the crash dump file 110.

At block 408, a content file is generated. The content file thus generated records one or more section parameters, such as start markers, end markers, boundary offsets, section size, and a checksum for each valid section, as valid section parameters. In addition, the content file may also record the information pertaining to the type of data within each section. For example, the instructions 206 within the system 202 when executed result in recording the section parameters of the valid section(s) 210 as valid section parameter(s)

212 in the content file 112. In addition to recording the valid section parameter(s) 212, the information describing the type of data within the section(s) 210 is also recorded into the content file 112 as section information 214.

Once the crash dump file 110 and the content file 112, the crash dump file 110 may be transmitted to a system 102 for determining one or more probable causes behind the crash of the affected system 202.

FIG. 5 illustrates a method 500 for handling truncation of a crash dump file, in accordance with one example of the present subject matter. The method 500, in an example, may be implemented within the affected system 202. In the context of method 500, at block 502, prior to generation of the crash dump file, the available storage volume of the crash dump partition is compared to the size of crash-related data which is to be written to the crash dump partition. For example, the instructions 206 within the affected system 202 when executed may result in a comparison of the size of the crash-related data 208 and the crash dump partition 216 which is available within the affected system 202.

At block 504, on determining the size of the crash-related data to be greater that the storage volume available in the crash dump partition, the crash dump partition is further partitioned into a fixed partition and a rolling partition 220. For example, the affected system 202, on determining the size of the crash-related data 208 to be greater than the storage volume of the crash dump partition, partitions the crash dump partition 216 into a fixed partition 218 and a rolling partition 220. The size of the fixed partition 218 and the rolling partition 220 may be such that the size of the fixed partition 218 is greater than the size of the rolling partition 220.

At block 506, a portion of the crash-related data is written onto the fixed partition. For example, the affected system 202 may write a portion of the crash-related data 208 onto the fixed partition 218, such that the entire fixed partition 218 is accommodated by such portion of the crash-related data 208. It may be noted that such a portion accommodated onto the fixed partition 218 may further include one or more valid section(s) 210 of the crash dump file 110.

At block 508, a content file is created. For example, the affected system 202 may further generate the content file 112 which records one or more valid section parameter(s) 212 pertaining to the section information 214 corresponding to the valid section(s) 210 which have been written into the fixed partition 218. On creation of the content file 112, crash-related data 208 corresponding to the valid section(s) 210 written into the fixed partition 218 is recorded into the content file 112.

At block 510, portion of the remaining crash-related data is written onto the rolling partition. For example, the affected system 202 writes another portion of the remainder of the crash-related data 208 onto the rolling partition 220. Such smaller portions may also include a certain (although smaller) number of valid section(s) 210.

At block 512, information pertaining to crash-related data within the sections written into the rolling partition is determined and recorded into the content file. For example, the affected system 202 may determine the information pertaining to the crash-related data 208 of the section(s) 210 written into the rolling partition 220 and record such information as section information 214 within the content file 112.

At block 514, a subsequent portion of the remaining crash-related data is over-written onto previously written crash-related data within the rolling partition. For example, the affected system 202 may write subsequent portions of the remaining crash-related data 208 onto the rolling partition 220. To this end, the previously written crash-related data 208 in the rolling partition 220 is over-written by crash-related data 208 of the subsequent portions.

At block 516, information pertaining to sections within subsequent portions of the crash-related data is determined and recorded into the content file. For example, the affected system 202 may determine the section information 214 pertaining to section(s) 210 within the subsequent portions which were written into the rolling partition. It may be noted that section information 214 pertaining to subsequent portion of the crash-related data 208 is recorded in addition to the section information 214 of previously written (but then over-written) crash-related data 208. In this manner, despite the fact that the crash-related data 208 being written into the rolling partition 220 may be subsequently over-written, the section information 214 pertaining to such portions of crash-related data 208 is nevertheless recorded in the content file 112.

At block 518, it is determined whether the entire crash-related data has been written or not. In case subsequent portions are still remaining ('No' path from block 418), such portions are again obtained and written into the rolling partition 220 as part of the recurring steps (blocks 514-516). In case all crash-related data 208 has been written in recursive steps onto the rolling partition 220 ('Yes' path from block 518), the content file 112 may be marked as completed (block 520). In an example, a count value may be determined based on the number of times the rolling partition 220 is rewritten with portions of crash-related data. Based on the count value, a size of crash-related data 208 which has been lost due to the truncation may be estimated. In such a manner, a debugging administrator may be in a position to ascertain whether the crash dump file 110 thus obtained is truncated or not. Furthermore, the debugging administrator may also determine, in the event that the crash dump file 110 is truncated, the crash-related data 208 which may have been lost owing to the truncation.

FIG. 6 illustrate method 600 for examining crash dump file, in accordance with one example of the present subject matter. At block 602, a crash dump file and a corresponding content file are obtained. For example, the system 102 may obtain the crash dump file 110 and the corresponding content file 112 generated by affected system 202 (i.e., the system which had crashed). The crash dump file 110 may include crash-related data 208 defined in a plurality of existing section(s) 226. It may be noted that the existing section(s) 226 are to be assessed to determine whether the obtained crash dump file 110 has been corrupted. Continuing with the present example, the content file 112 may include recorded valid section parameter(s) 212 corresponding to valid section(s) 210 of the crash dump file 110 as it were existing prior to the transmission to the system 102. In addition, the content file 112 may further include section information 214 pertaining to the crash-related data 208 stored within such corresponding existing section(s) 226.

At block 604, the crash dump file is inspected to determine a set of parameters corresponding to the sections within which crash-related data is present. For example, the system 102 may inspect the crash dump file 110 to obtain a set of section parameters, stored as existing section parameter(s) 228. The existing section parameter(s) 228 may be considered as one or more attributes for each section within the crash dump file 110. In an example, the existing section parameter(s) 228 may include an existing start and end address marker, existing boundary offset, existing size and an existing checksum corresponding to any given one of the existing section(s) 226.

At block 606, one or more valid section parameters from the content file are obtained. For example, the system 102 may parse the content file 112 to obtain one or more valid section parameter(s) 212 included therein. The valid section parameter(s) 212 record parameters pertaining to the valid section(s) 210 of the crash dump file 110, when the crash dump file 110 was available within the affected system 202. In an example, the valid section parameter(s) 212 may include valid start and end address marker, valid boundary offset, valid size and an valid checksum corresponding to any given one of the valid section(s) 210. In another example, the valid section parameter(s) 212 may be one of the parameters indicated in FIG. 3, as explained in conjunction with FIG. 2.

At block 608, the set of existing section parameters obtained from the crash dump file and the valid section parameters obtained from the content file are compared. In an example, the system 102 may compare the existing section parameter(s) 228 with corresponding the valid section parameter(s) 212. For example, the system 102 may compare the existing start and end markers with corresponding valid start and end markers. On a successful match between the start and end markers, the system 102 may further compare the existing section size and the valid section size. In response to the existing section size and the valid section size matching, the system 102 may proceed further and compare the value of the existing checksum and the value of the valid checksum. Although explained in conjunction with the present example section parameters, other section parameters may also be utilized without deviating from the scope of the present subject matter.

At block 610, it is determined whether the existing section parameters and the valid section parameters matched or not. In an example, the assessment is done for each existing section(s) 226 within the crash dump file 110. For any one given existing section amongst the existing section(s) 226, if all the existing section parameter(s) 228 matches the corresponding valid section parameter(s) 212 recorded in the content file 112 ('Yes' path from block 610), the method may proceed to perform a similar comparison with the next section from one of the crash dump file 110. If any existing section parameter(s) 228 fails to match the corresponding valid section parameter(s) 212 in the content file 112 ('No' path from block 610), an indication may be provided to convey that the section under consideration is corrupt and is not valid (block 612). Thereafter, the section information 214 corresponding to the corrupted section may be retrieved and provided (block 614). For example, a mismatch between the value of the existing checksum and the valid checksum may indicate that a given existing section may have changed from an earlier valid version of the section. The same process may be performed for all section(s) 210 within the crash dump file 110 and accordingly the corresponding section information 214 may be retrieved and provided to a debugging administrator. In an example, the section information 214 may be utilized by the debugging administrator to assess whether the crash dump file 110 may be used to determine probable causes of the crash of the affected system 202.

FIG. 6 illustrates a computing environment 700 implementing a non-transitory computer readable medium for examining a crash dump file generated in response to a crash of a computing system, such as the affected system 202. In an example, the computing environment 700 includes processor(s) 702 communicatively coupled to a non-transitory computer readable medium 704 through a communication link 706. In an example implementation, the computing environment 700 may be for example, the network environment 200. In an example, the processor(s) 702 may have one or more processing resources for fetching and executing computer-readable instructions from the non-transitory computer readable medium 704. The processor(s) 702 and the non-transitory computer readable medium 704 may be implemented, for example, in system 102.

The non-transitory computer readable medium 704 may be, for example, an internal memory device or an external memory device. In an example implementation, the communication link 706 may be a network communication link, such as of network 204. The processor(s) 702 and the non-transitory computer readable medium 704 may also be communicatively coupled to a computing device 708 over the network. The computing device 708 may be implemented, for example, as computing device 202, which may have experienced a system crash.

In an example implementation, the non-transitory computer readable medium 704 includes a set of computer readable instructions 710 which may be accessed by the processor(s) 702 through the communication link 706 and subsequently executed to perform acts for feature-based reporting of software versions.

Referring to FIG. 6, in an example, the non-transitory computer readable medium 704 includes instructions 710 that cause the processor(s) 702 to examine a crash dump file, such as the crash dump file 110, to ascertain whether the crash dump file under consideration is corrupt or not. To this end, the instructions 710 when executed may parse a crash dump file 110. The crash dump file 110 may further include crash-related data 208 which is defined in a plurality of sections, referred to as existing section(s) 226. Based on the parsing of the crash dump file 110, in existing section parameter(s) 228 pertaining to the existing section(s) 226 may be obtained.

With the existing section parameter(s) 228 determined, the instructions 710 upon execution may further result in comparing the obtained existing section parameter(s) 228 with corresponding valid section parameter(s) 212 recorded in a content file 112. In an example, the valid section parameter(s) 212 may be considered as section parameters pertaining to valid versions of section(s) 210 as they existed at the time of generation of the crash dump file 110. Based on the comparison between the obtained existing section parameter(s) 228 with the valid section parameter(s) 212, the instructions 710 may result in generation of an indication reporting the section as corrupt or valid. Based on the indication, a debugging administrator may further assess whether the crash dump file 110 may be used for determining the probable causes which led to the crash of the affected system 202.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

What is claimed is:

1. A system comprising:
a processor; and
a machine-readable storage medium comprising instructions executable by the processor to:

receive, at the system, a crash dump file comprising crash-related data, wherein the crash dump file is generated by and transmitted from an affected system to the system, wherein the crash-related data is defined within a plurality of sections of the crash dump file;

obtain a content file corresponding to the crash dump file, wherein the content file lists valid section parameters defining attributes of valid versions of each of the plurality of sections of the crash dump file;

inspect the crash dump file to obtain a set of existing section parameters pertaining to each of the plurality of sections of the crash dump file; and determine whether any one of the plurality of sections of the crash dump file is corrupt based on a comparison of the existing section parameters for the crash dump file with the valid section parameters of the content file.

2. The system as claimed in claim 1, wherein the instructions are executable to:

parse the crash dump file to identify each of the plurality of sections; and determine, based on the parsing, the existing section parameters for each of the plurality of sections of the crash dump file to obtain the set of existing section parameters, the set comprising existing section parameters for each of the plurality of sections.

3. The system as claimed in claim 1, wherein the instructions are executable to:

determine a given section from the plurality of sections of the crash dump file as corrupt in response to a determination that a given existing section parameter for the given section does not match a valid section parameter listed in the content file for a valid version of the given section.

4. The system as claimed in claim 1, wherein for each of the sections:

the valid section parameters comprise one or more of:
  a valid start address marker indicating a starting boundary of the valid version of the section;
  a valid end address marker indicating a terminating boundary of the valid version of the section;
  a valid boundary offset corresponding to the valid version of the section;
  a valid section size corresponding to the valid version of the section; or
  a valid checksum corresponding to the valid version of the section; and the existing section parameters comprise one or more of:
  an existing start address marker indicating a starting boundary of the section;
  an existing end address marker indicating a terminating boundary of the section;
  an existing boundary offset corresponding to the section;
  an existing section size corresponding to the section; or
  an existing checksum corresponding to the section.

5. The system as claimed in claim 1, wherein the content file is generated in response to generation of the crash dump file.

6. The system as claimed in claim 1, wherein:

for each of the sections, the valid section parameters include a valid start address marker and a valid end address marker, and the existing section parameters include an existing start address marker and an existing end address marker; and the instructions are executable to, for each of the sections:
  compare the existing start and end address markers of the section with the valid start and end address markers of the valid version of the section.

7. The system as claimed in claim 6, wherein:

for each of the sections, the valid section parameters include a valid section size and the existing section parameters include an existing section size; and the instructions are executable to, for each of the sections:
  in response to determining that the existing start and end address markers match the valid start and end address markers, compare the existing section size of the section with the valid section size of the valid version of the section.

8. The system as claimed in claim 6, wherein:

for each of the sections, the valid section parameters include a valid checksum and the existing section parameters include an existing checksum; and the instructions are executable to, for each of the sections:
  in response to determining that the existing section size matches the valid section size, compare the existing checksum of the section with the valid checksum of the valid version of the section; and
  in response to determining that the existing checksum matches the valid checksum, determine that the section is valid.

9. The system as claimed in claim 1, wherein the instructions are executable to further:

receive through transmission a valid checksum value of the content file, wherein the valid checksum value of the content file was derived prior to transmission of the content file;

recalculating another checksum value of the received content file; and comparing the valid checksum value of the content file and the other checksum value to ascertain whether the content file is corrupt.

10. A method comprising:

generating a crash dump file to be written to a crash partition, wherein the crash dump file comprises crash-related data defined in a plurality of valid sections of the crash dump file;

identifying section parameters corresponding to each of the plurality of valid sections;

determining information pertaining to the crash-related data in the crash dump file for each of the plurality of valid sections;

generating a content file, wherein the content file records the section parameters corresponding to each of the plurality of valid sections as valid section parameters and the information pertaining to the crash-related data;

detecting a start tag in the content file, wherein the start tag was recorded in the content file on commencement of the generating of the crash dump file;

in response to detecting the start tag, checking for whether an end tag is recorded in the content file, wherein an end tag is recorded on reaching the end of the crash-related data when writing the crash dump file; and when an end tag is not present in the content file, generating an indication reporting that writing of the crash dump file was abruptly aborted.

11. The method as claimed in claim 10, wherein the crash-related data comprises contents of a memory of the affected system, wherein the affected system comprises a processor-based computing system having experienced a system crash.

12. The method as claimed in claim 10, wherein the generating the content file comprises:
  determining, while writing the crash-related data to the crash dump file, a descriptor of the crash-related data being written into the crash dump file; and
  recording the descriptor as the information pertaining to crash-related data into the content file.

13. The method as claimed in claim 10, wherein the generating the crash dump file in the crash partition further comprises:
  comparing a size of the crash partition and a size of the crash-related data;
  in response to determining the size of the crash-related data to be greater than the size of crash partition:
    partitioning the crash partition into a fixed partition and a rolling partition;
    writing a first portion of the crash-related data to the fixed partition;
    writing a second portion of crash-related data to the rolling partition; and
    overwriting the second portion, previously written to the rolling partition, with a subsequent portion of the crash-related data.

14. The method as claimed in claim 13, wherein the method further comprises:
  recording section parameters pertaining to the first portion of the crash-related data in the content file, in response to the writing of the first portion to the fixed partition;
  recording section parameters pertaining to the second portion of crash-related data in the content file, in response to the writing of the second portion to the rolling partition; and
  recording section parameters pertaining to the subsequent portion of the crash-related data in the content file, in response to writing of the subsequent section parameters to the rolling partition.

15. The method as claimed in claim 10, wherein the section parameters for each of the valid sections comprise one or more of:
  a start address marker indicating a starting boundary of the valid section;
  an end address marker indicating a terminating boundary of the valid section;
  a boundary offset corresponding to the valid section;
  a section size corresponding to the valid section; and
  a checksum corresponding to the valid section.

16. A non-transitory computer-readable storage medium comprising instructions executable by a processing resource of a system to:
  parse, at the system, a crash dump file comprising crash-related data to obtain a set of existing section parameters pertaining to each of a plurality of sections of the crash dump file, wherein the crash dump file is generated by and transmitted from an affected system to the system;
  for each section of the plurality of sections, compare the existing section parameters for the section of the crash dump file with valid section parameters defining attributes of a valid version of the section of the crash dump file, wherein the valid section parameters are recorded in a content file; and
  based on the comparisons of the existing section parameters for the crash dump file with the valid section parameters of the content file, generate an indication reporting that a given section of the crash dump file is corrupt.

17. The non-transitory computer-readable storage medium of claim 16, wherein the valid section parameters comprise one or more of a start address marker indicating a boundary of a section, an end address marker indicating a boundary of a section, a boundary offset, a section size, or a checksum.

18. The non-transitory computer-readable storage medium of claim 16, wherein the instructions, are executable to, for each of the sections:
  compare the existing section parameters for the section with valid section parameters defining attributes of a valid version of the section, wherein the valid section parameters are recorded in the content file; and
  generate an indication reporting that the section of the crash dump file is corrupt when the existing section parameters for the section do not match the valid section parameters for the valid version of the section.

19. The non-transitory computer-readable storage medium of claim 16, wherein the instructions executable:
  compare a valid checksum value of the content file, derived prior to transmission of the content file from a system having experienced a crash, with another checksum value derived from the content file after it is received via a transmission from another system; and
  compare the valid checksum value of the content file and the other checksum value to determine whether the content file is corrupt based on the comparison of the valid checksum value of the content file and the other checksum value.

* * * * *